United States Patent
Adams

[15] 3,645,542
[45] Feb. 29, 1972

[54] SEALING RINGS

[72] Inventor: Frederick J. Adams, Campton, England

[73] Assignee: Cam Gears Limited, Hitchin, Hertfordshire, England

[22] Filed: May 25, 1970

[21] Appl. No.: 40,319

[30] Foreign Application Priority Data

June 10, 1969 Great Britain.....................29,336/69

[52] U.S. Cl..................................................277/1, 277/63
[51] Int. Cl........................................................F16j 15/18
[58] Field of Search...........................................277/63, 205

[56] References Cited

UNITED STATES PATENTS 2,705,177   3/1955   Waring..............................277/205 X

FOREIGN PATENTS OR APPLICATIONS 561,321           Great Britain.........................277/205

*Primary Examiner*—Robert I. Smith
*Attorney*—Hill, Sherman, Meroni, Gross & Simpson

[57] ABSTRACT

A multiple ring seal installed with the constituent rings in separated relation and automatically assembled upon application of pressure after installation. The seal includes an axially grooved resilient first ring and a rigid second ring having at least a portion seated in the groove of the first ring to stiffen the inner and outer peripheral sealing legs of the first ring. The resilient first ring is sufficiently flexible that during installation it will easily pass through a bore or around a member to be sealed without being damaged by rough surfaces, ports or recesses and the rigid second ring may be split or sized to fit the parts to be sealed. The second ring may have a head flange overlying the first ring to align with the groove a stem portion to be seated in the first ring.

9 Claims, 7 Drawing Figures

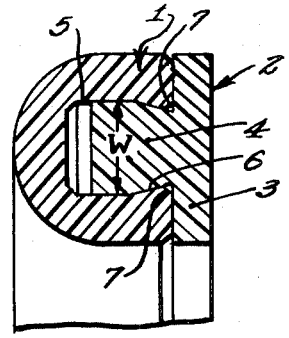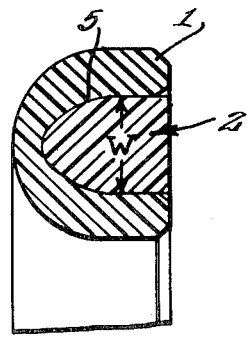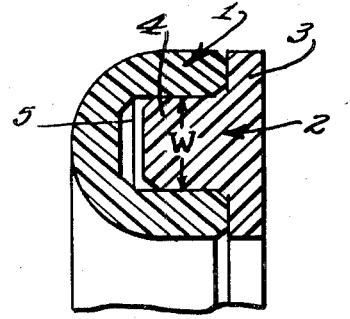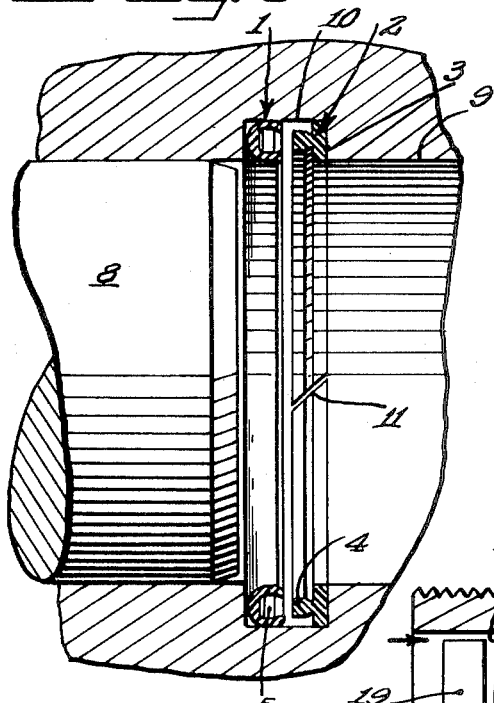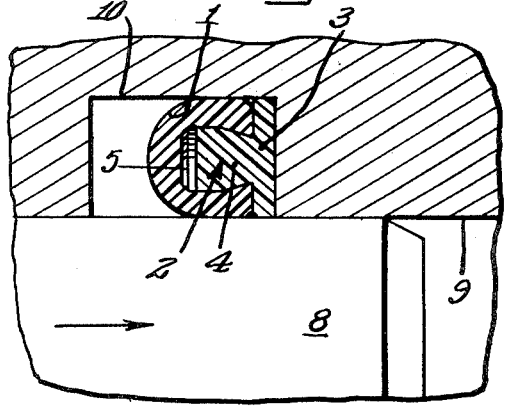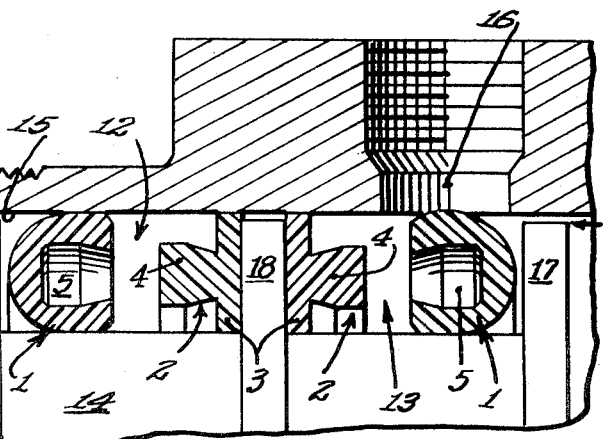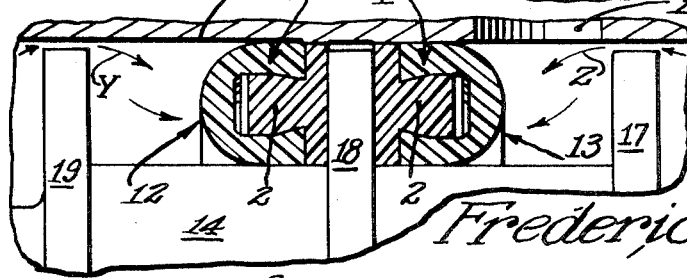

SEALING RINGS

BACKGROUND OF THE INVENTION

1. Field of the Invention

This invention relates to the art of packings or seal rings for forming a fluidtight seal between two members and especially for sealing the annular gap between two coaxial members. The invention includes external seal rings seated in an annular groove around an inner member such as a piston or a spool valve for sealingly engaging a surrounding member such as a cylinder wall or valve housing as well as internal seals where a groove is provided in a bore such as a shaft housing or bearing for sealingly engaging an inner member such as a shaft.

2. Description of the Prior Art

It has heretofore been customary to use sealing rings of either "O" or "U" cross section to provide a fluidtight seal between a housing and a shaft or spool in the housing. Such seals have an external diameter larger than the internal diameter of the surrounding member or an internal diameter smaller than the inner seat for the ring so that in operation the ring is in a state of radial compression. If the bore in which the seal ring is inserted or if the member around which the seal ring is mounted, has a rough surface or contains a port or recess the sealing ring may be damaged during assembly as by being cut with the rough surface or by an edge of the port or recess across which the ring must pass during installation.

SUMMARY OF THE INVENTION

This invention now provides a sealing ring assembly which is less susceptible to damage during installation than heretofore known resilient seal rings or packings.

According to this invention a two component seal ring assembly is provided for installation in separated condition to be automatically assembled under pressure of the fluid media being sealed. The first component is substantially a ring with a U-shaped radial cross section having its groove opening in the axial direction and made from a resilient material. The second component is a more rigid ring having at least a portion adapted to enter the groove of the first component and remain therein during use. This second component need not be resilient. Suitable materials for the first component are elastomers such as rubber, synthetic resins and the like which are sufficiently hard to withstand the pressures for which the assembly is designed without extruding into the gap being sealed. The second component is preferably made of a material harder or stiffer than the first component such as a harder rubber, a rubber plastic, or a plastics material, for example, of the nylon or "Delrin" type.

An assembly in which the seals of this invention are installed includes a first member with a cylindrical housing in which is axially slidable a second member having a substantially cylindrical surface. One of these members has an annular recess within which the seal rings are mounted in spaced apart or separated condition. When exposed to the fluid pressure between the housing and the inserted member, the resilient grooved first ring will automatically be forced onto at least a portion of the harder second ring to provide a fluid seal between the housing and the cylindrical surface part.

The first component of the sealing ring of the invention can be made with a cross section allowing a greater depth of the "U" and a greater spacing between the limbs thereof than has hitherto been conventional in U-section sealing rings. The first component is thus much more flexible than conventional U-rings and conventional O-rings and is thus better capable of flexing when encountering an irregularity or discontinuity in the wall of a bore and less liable to damage from such encounter. The sealing ring of the invention is therefore assembled to its working position with its two components separate. When the ring is in the working position, the first application of pressure to the first component on the side facing away from the second component will move the first component axially towards the second component and cause the groove fitting part on the second component to enter the groove of the first component. The part inserted in the groove thus reinforces the first component and causes the ring to make an effective seal. It will be appreciated of course that the seal of the invention is unidirectional and is only effective against pressure applied to the first component, not against pressure applied to the second component.

Preferably the groove fitting part has a radial width substantially equal to the radial width of the groove, and conveniently somewhat greater than the width of the groove so that when the part is in the groove the U-ring is opened somewhat and the relatively limp limbs thereof are compressed between the part and, respectively, the surfaces against which the radially outer and inner surfaces of the U-ring seal. This enhances the effectiveness of the seal.

Preferably the second component when seen in radial cross section has a flange from which the groove fitting part projects transversely. In use the flange will lie in a plane transverse to the axis of the assembly, the radial edges of the flange abutting, respectively, the surfaces against which the radially outer and inner surfaces of the U-ring seal. This arrangement has the advantage of positively locating said part so that it is spaced from said surfaces around the whole of its circumference, thus facilitating engagement with the groove of the first component. A further advantage also accrues in that the flange tends to prevent extrusion of the sealing ring from its housing when the ring is subjected to extremely high pressures.

Alternatively, the second component may have a simple rectangular radial cross section, and all or part of the component may fit within the groove.

The radial cross sections of the two components may be such that the part fitting in the groove, and the section of the groove receiving said part, are of constant width, or either of these widths may vary along the axial direction of the groove or part.

In some applications of the sealing ring of the invention the second component can be formed as a continuous annular member; for other applications the second component must be formed with an axial cut so that the component may be radially opened and closed. The cut may preferably take the form of a scarf joint.

It is then an object of this invention to provide a two component seal ring installed in separated condition and automatically assembled under pressure of the fluid media to be sealed.

Another object of this invention is to provide a multiple part packing having a first axially grooved resilient ring and a second harder ring with at least a portion seated in the axial groove during use to reinforce the first ring and cause it to make an effective seal.

Another object of this invention is to provide a two component seal ring with a first resilient axially grooved ring and a second T-shaped hard ring with a stem seated in the axial groove of the first ring and a head centering the stem for insertion in the groove.

A still further object of the invention is to provide a seal ring assembly for mounting in a groove of one part to sealingly engage a surface of another part which comprises a first axially grooved resilient ring and a second harder T-shaped ring having its stem inserted in the groove of the first ring and its crossbar abutting the bottom of the groove and the part to be sealed.

A still further object of this invention is to provide a two ring seal having a first resilient ring of U-shape in transverse cross section and a second split hard ring with at least a portion retained in the groove of the first ring and effective to stiffen and expand the legs of the first ring into sealing engagement with the parts to be sealed.

Other and further objects of this invention will be apparent to those skilled in this art from the following detailed description of the annexed sheet of drawings which, by way of examples shows several preferred embodiments of the invention.

BRIEF DESCRIPTION OF THE DRAWINGS

FIGS. 1, 2 and 3 show cross sections through three different embodiments of the seal ring of this invention;

FIG. 4 shows one manner of assembly of the seal ring of FIG. 1;

FIG. 5 is a fragmentary view similar to FIG. 4 but showing the components after installation and use;

FIG. 6 shows an alternative manner of assembly of the seal ring of FIG. 1;

FIG. 7 is a view similar to FIG. 6 but showing the components after use.

DESCRIPTION OF THE PREFERRED EMBODIMENT

The sealing rings shown in FIGS. 1 to 3 all comprise a first annular component 1 having a substantially U-shaped cross section, and a second annular component 2. The component 1 is made from a resilient material, preferably a fairly hard rubber that will withstand the pressures for which the sealing ring is designed. Component 2 is preferably made from a material harder than that of component 1, suitably a harder rubber, a rubber plastic or a plastics material, for example of the nylon/delrin type.

FIG. 1 shows a construction wherein component 2 is formed with a flange 3 from which projects transversely a part 4 received in the groove 5 which opens in the axial direction of the component 1. The part 4 is joined to the flange 3 by a narrowed neck 6, and the limbs of component 1 have inwardly directed projections 7 at their ends. The projections 7 and neck 6 do, to some extent, restrain the components 1 and 2 from axial separation.

In the construction of FIG. 2, the component 2 is a flangeless ring, and the whole of the component is received in the groove 5 of the component 1.

In FIG. 3, the component 2 has a flange 3 from which projects a part 4 of constant radial width.

In all of these three constructions the radial width w of the part received in the groove 5 is somewhat greater than the radial width of the groove when the component 1 is in its relaxed state, i.e., when the components are axially separated.

FIG. 4 shows the manner in which the sealing ring of FIG. 1 can be used to provide a sealing between a shaft 8 and a bore 9, the sealing ring being seated in an annular recess 10 formed in the bore. The recess 10 has an axial length slightly greater than the aggregate axial lengths of the first component 1 and second component 2 of the sealing ring mounted in it. To form this assembly the component 1 is radially compressed and is inserted into the bore from an open end thereof until the recess 10 is reached, whereupon the component expands to seat in the recess. The component 2 is also radially compressed and passed through the bore to the recess where it expands radially to the condition shown in the Figure, the flange 3 lying against the groove to locate the part 4 in alignment with the groove 5 in component 1. The component 2 is cut along a diagonal line or scarf joint 11 to allow the component to be radially expanded and contracted. The shaft 8 is then located in the bore.

It will be seen in FIG. 5 that when pressure is applied in the bore in the direction of the arrow the first component 1 will be forced against the second component 2 so that the part 4 enters the groove 5 to radially expand the first component and press the limbs against the bore and the shaft respectively. The sealing ring will then be effective to seal against pressure applied in the direction of arrow but not against pressure applied in the opposite direction. The components 1 and 2 will probably remain in their assembled condition for the life of the sealing ring, but if the assembly needs to be broken down then the components can easily be separated and removed from the recess 10.

Referring now to FIG. 6 this shows the use of two opposed sealing rings 12 and 13, each as shown in FIG. 1, in sealing a piston 14 working in a cylinder 15 having a radial port 16. The piston is assembled with rings 17, 18 and 19 held together by axial bolts (not shown) and forming annular recesses in which the sealing rings 12 and 13 are received. The sealing rings can have each component thereof designed to fit exactly over the piston and the second component need not be cut as shown in FIG. 4. The Figure shows sealing ring 13 in a position such that its first component lies opposite the port 16, and the fact that this component is compressed between the piston and the cylinder will mean that the component expands locally into the port. The flexibility of the component is, however, such that it yields without damage when it encounters the edge of the port to reenter the cylinder 15.

In use, as shown in FIG. 7, the two assembled sealing rings 12 and 13 are effective each to seal the piston against fluid leakage in opposite directions, the seal 12 sealing against pressure in the direction Y and the seal 13 sealing against pressure in the direction Z.

I claim:

1. A two component packing ring for installation in separated condition in an annular recess of one part to sealingly engage a second part which comprises a first component grooved ring of resilient material having a substantially U-shaped radial cross section with its groove opening in an axial direction of the ring and a second component ring harder than the first ring having a portion lying in and conforming with the groove of the first ring to support the inner and outer peripheries of the first ring in sealing engagement with the bottom of the recess of the one part and the second part, and said first and second rings being automatically assembled to act as a unit when the first ring is exposed to pressure to be sealed.

2. The assembly of claim 1, in which the conforming portion of the second ring inserted in the groove of the first ring has a greater radial width than the groove for compressing the inner and outer peripheries of the first ring supported thereon against the bottom of the annular recess of the one part and the second part.

3. A multiple ring seal comprising a resilient axially grooved first ring with inner and outer peripheral sealing legs and a second ring having a stem portion fitting the groove of the first ring supporting said legs against the surfaces to be sealed and a flange portion overlying the grooved face of the first ring to align the stem portion with the groove of the first ring for automatic assembly of the two rings in use.

4. The seal of claim 3, wherein the stem has a uniform radial width greater than the groove width compressing the legs along their lengths against the parts to be sealed.

5. A two component seal ring for installation between concentric annular parts to be sealed with the components separated from each other comprising a resilient continuous ring of U-shape in cross section having a groove opening in one side face thereof and relatively limp sealing legs around the inner and outer peripheries of the continuous ring, and a rigid, split ring on the grooved face side of the continuous ring having a portion sized to automatically enter the groove of the continuous ring when fluid pressure on the continuous ring between the concentric parts forces the continuous ring against the rigid ring thereby stiffening the limp legs and holding them against the concentric annular parts.

6. The resilient ring of claim 5 having a rounded nose and the side thereof opposite the grooved side diverging from an apex to the sealing legs.

7. A multiple seal ring comprising a resilient axially grooved first ring, a second ring having a stem portion fitting the groove of the first ring and a flange portion overlying the groove face of the first ring effective to align the stem portion with the groove for automatic assembly of the two rings in use, said stem having a restricted neck adjacent to said flange and said groove having a restricted mouth engaging said neck to retain the two rings in assembled relation.

8. A two component packing ring for installation in separated condition in an annular recess of one part to sealing engage a second part which comprises a first component grooved ring of resilient material having a substantially U- shaped radial cross section with its groove opening in the axial direction of the component and converging toward the bight portion of the "U" and a second component ring harder than the first ring having a portion of conforming groove fitting configuration lying into the groove of the first component ring to cause the inner and outer peripheries of said first ring to sealingly engage the bottom of the recess of the one part and the second part, and said first and second components being automatically assembled when exposed to pressure to be sealed.

9. The method of installing a seal between two concentric parts, one of which has an annular recess which comprises seating a resilient axially grooved ring and a rigid backup ring in separated relation in said recess, and assembling the grooved ring on the backup ring to form a unidirectional seal unit with pressure of the media to be sealed applied to the grooved ring between the parts.

* * * * *